United States Patent [19]

Dudeck et al.

[11] Patent Number: 4,523,136
[45] Date of Patent: Jun. 11, 1985

[54] SAFETY ARRANGEMENT FOR AN ADJUSTMENT INSTALLATION OF A SEAT ADJUSTABLE MANUALLY OR PROGRAMMED

[75] Inventors: Ingo Dudeck, Weinstadt; Ulrich Hipp, Wernau/Neckar; Manfred Maass, Esslingen; Harald Ruoff, Stuttgart, all of Fed. Rep. of Germany

[73] Assignee: Daimler-Benz Aktiengesellschaft, Stuttgart, Fed. Rep. of Germany

[21] Appl. No.: 601,004

[22] Filed: Apr. 16, 1984

[30] Foreign Application Priority Data

Apr. 15, 1983 [DE] Fed. Rep. of Germany ....... 3313633

[51] Int. Cl.³ ............................................. G05B 19/42
[52] U.S. Cl. .................................... 318/568; 318/466; 296/65 R
[58] Field of Search ............... 318/466, 467, 468, 568; 364/424; 296/63, 65

[56] References Cited

U.S. PATENT DOCUMENTS

| | | | |
|---|---|---|---|
| 4,267,494 | 5/1981 | Matsuoka et al. | 318/568 |
| 4,401,928 | 8/1983 | Kamijo et al. | 318/466 |
| 4,434,468 | 2/1984 | Caddick et al. | 318/466 X |
| 4,463,426 | 7/1984 | Caddick et al. | 364/424 |
| 4,467,252 | 8/1984 | Takeda et al. | 318/568 X |
| 4,468,596 | 8/1984 | Kinzl et al. | 318/468 X |

*Primary Examiner*—B. Dobeck
*Attorney, Agent, or Firm*—Craig and Burns

[57] ABSTRACT

A safety arrangement for an adjusting installation of a seat adapted to be actuated manually or programmed, especially of a vehicle seat, with adjusting motors and with an electronic circuit which gives priority to the manual seat adjustment over a programmed seat adjustment, which, in case of a relay or adjusting motor defect, opens up the corresponding circuit, which in case of a simultaneous actuation of several position buttons, interrupts a programmed seat adjustment and which after interruption of the energy supply permits a programmed seat adjustment only after renewed storage of a seat position.

11 Claims, 1 Drawing Figure

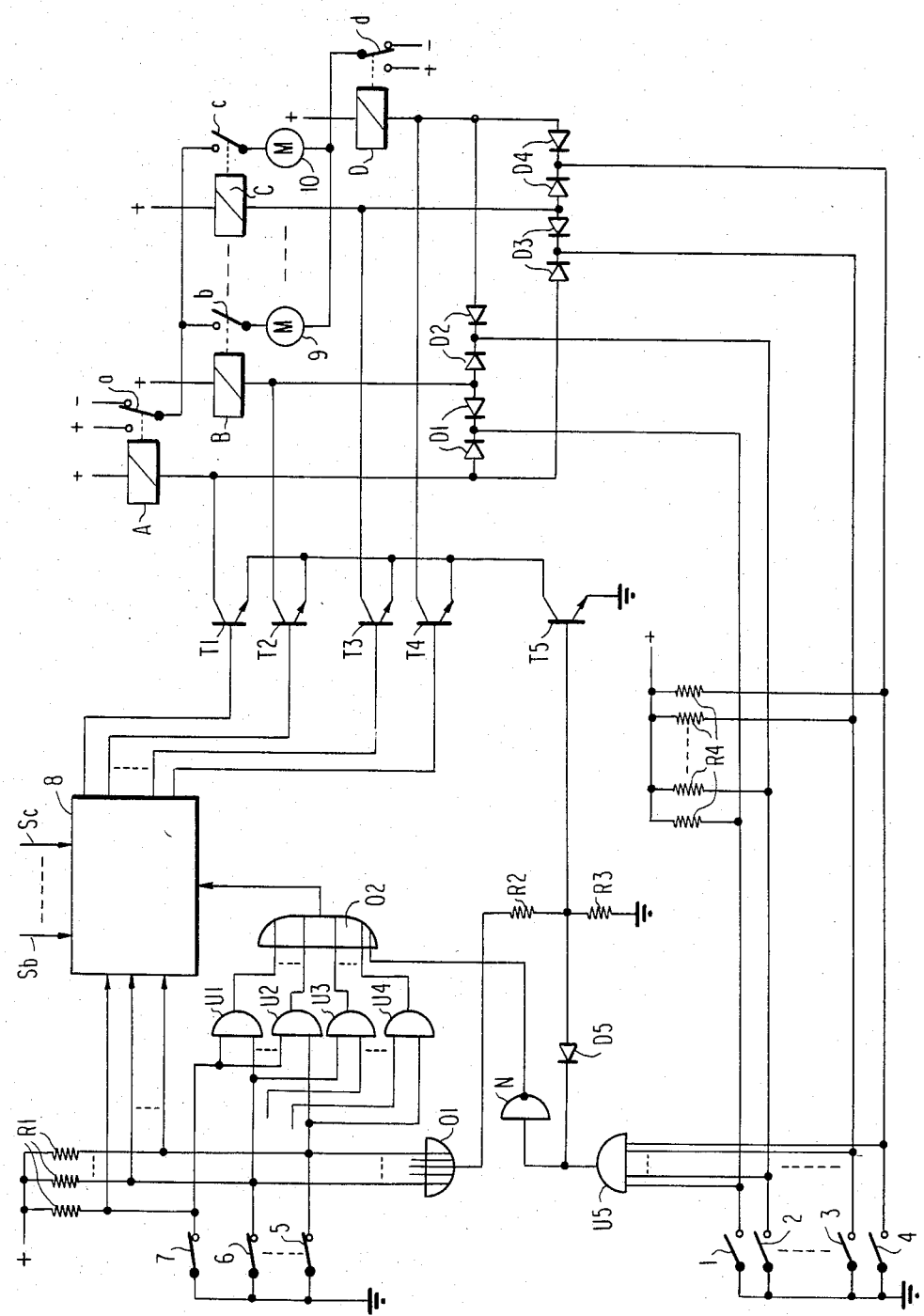

SAFETY ARRANGEMENT FOR AN ADJUSTMENT INSTALLATION OF A SEAT ADJUSTABLE MANUALLY OR PROGRAMMED

The present invention relates to a safety arrangement for an adjustment installation of a seat, actuatable either by hand and/or programmed, especially of a vehicle seat, with an adjusting motor for each adjusting plane energizable by way of relay contacts and with a control logic circuit having a position memory for storing certain seat positions by way of a memory push button.

Such seats with seat-adjusting mechanisms are included in certain vehicles as standard equipment, but are also available as optional equipment for the subsequent refitting.

With a careless actuation of the adjusting installation, it may happen that several manual adjustment and/or position push buttons are depressed simultaneously and positions are adjusted thereby which are not intended. Such undesired positions, however, may also be produced, if in case of an error in the memory or in the control logic, false commands are issued. Such undesired position adjustments may also occur if the memory contents have been lost after the power supply has been disconnected and reconnected. A defect of an adjusting motor or sticking relay contacts may also lead to a continuous motor control energizing the motor and therewith to a destruction.

Such troubles should be prevented to the greatest possible extent or should be recognized immediately and turned off.

It is the object of the present invention to provide a safety arrangement for a seat-adjusting installation in which the manual seat adjustment is to have priority over the programmed seat adjustment and which is capable to interrupt the adjustment operation in case of a computer defect or in case of an actuation of several position buttons or oppositely directed manual adjusting buttons, to turn off the energizing control of an adjusting motor in case of a defect of the corresponding adjusting motor or of sticking relay contacts as well as in case of reconnection of the energy supply—after the memory contacts have been lost—to carry out a programmed seat adjustment only after renewed programming.

The underlying problems are solved according to the present invention by a particular circuit arrangement as will be described more fully hereinafter in the specification and the appended claims.

These and other objects, features and advantages of the present invention will become more apparent from the following description when taken in connection with the accompanying drawing which shows, for purposes of illustration only, one embodiment in accordance with the present invention, and wherein:

The single FIGURE is a schematic circuit diagram of a safety circuit arrangement for a seat-adjusting installation adapted to be actuated by hand or programmed.

Referring now to the single FIGURE of the drawing, four manual adjusting push buttons 1 to 4, two position push buttons 5 and 6 and a memory push button 7 are shown in this drawing. The three lines arranged between push buttons and other structural parts are to indicate that further push buttons, relays, motors, etc. may be provided which, however, have not been illustrated for the sake of simplicity of the drawing and ease of understanding of the invention.

Two adjusting motors 9 and 10 are controlled by way of four relays A, B, C, and D either directly by means of the manual adjusting push buttons 1–4 or indirectly by means of the position push buttons 5 and 6 by way of a control logic 8 having a memory. The adjusting motor 9 is series-connected with a normaly open cut-in or energizing contact b of the relay B and the adjusting motor 10 is series-connected with a cut-in or energizing contact c of the relay C. Both of these series circuits are connected in parallel. A change-over contact a of the relay A is series-connected with the aforementioned parallel circuit at one interconnection thereof and a change-over contact d of the relay D is connected at the other interconnection of the parallel circuit. In the normal de-energized condition, the change-over contacts a and d connect both interconnections of the parallel circuit with the negative terminal of a power supply whereas upon energization thereof, they connect these interconnections with the positive terminal of the power supply.

The energizing windings of all relays A to D are directly connected on one side with the positive terminal of the energy supply and are connected on the other side thereof with the negative terminal of the energy supply, on the one hand, by way of a diode matrix D1 to D4 and the manual adjusting buttons 1 to 4 and, on the other, by way of the series circuit of a respective transistor circuit T1 to T4 coordinated to the corresponding relay and of a transistor circuit T5 common to all the relays.

The diode matrix D1 to D4 is thereby so connected that upon actuation
of the manual adjusting button 1, the relays A and B are energized;
of the manual adjusting button 2, the relays B and D are energized;
of the manual adjusting button 3, the relays A and C are energized;
of the manual adjusting button 4, the relays C and D are energized.

The actuation of the relay A and of one of the relays B and C signifies a rotation of the coordinated adjusting motor in the one direction, whereas the actuation of the relay D and of one of the relays B and C signifies, in contrast thereto, a rotation of the coordinated adjusting motor in the other direction, i.e., in the opposite direction of rotation. The buttons 1 and 3, respectively, the buttons 2 and 4 can be depressed simultaneously if both adjusting motors are to be operated at the same time; with all other combinations of at least two manual adjusting buttons, both relays A and D are energized simultaneously, i.e., the change-over contacts thereof are switched to the positive terminal so that no current can flow any longer through the adjusting motors 9 and 10. Of three relay contacts a, b and d, respectively, a, c, d which are series-connected, the relay contact b or c coordinated to the respective adjusting motor and the relay contact a or d must be switched if current is to flow through the adjusting motor.

With a programmed seat adjustment, the control of the relays A to D takes place by way of the transistors T1 to T5 in the same combination of the relays. The coordination of the transistors to the relays can be seen from the drawing (T1 - A, T2 - B, etc.). The transistors T1 to T4 are controlled by the control logic 8 which includes a memory for different seat positions (in the instant case, for two seat positions), which are coordinated to the position buttons 5 and 6. These seat positions are adjusted by way of the manual adjusting buttons 1-4 and are then sotred by depressing a position button 5 or 6, to which they are to be coordinated, and the memory button 7.

During every subsequent actuation of one position button alone, the seat position coordinated thereto which has been stored, will be adjusted as long as the seat position remains stored in the memory.

This takes place by the control of the corresponding transistors T1 to T4 by the control logic 8 (at first for the one direction and subsequently for the opposite direction of rotation of the adjusting motors, if required). During control of the transistors, the collector-emitter circuits thereof become conductive and connect the corresponding relay to the negative terminal by way of the collector-emitter circuit of the common transistor T5.

The common transistor T5 is to remain conductive only during a programmed seat adjustment, as long as the coordinated position button is depressed. For this purpose, the base potential at transistor T5 is controlled dependent on the position of the manual adjusting and position buttons. A first OR-element O1 is provided which includes an input for each position button 5 and 6. Since the position buttons are closed in the normal position, an L-signal is present at all inputs as also at the output of the OR-element O1. The output of the OR-element O1 is connected with the negative terminal by way of a voltage divider R2 and R3. The base connection of the common transistor T5 is connected with the point of connection between resistors R2 and R3. A diode D5 is connected from this point of connection between the resistors R2 and R3 to the output of a multiple AND-element U5 whereby the forward direction of the diode D5 is torward the output of the AND-element U5. This multiple AND-element U5 has an input for each manual adjusting button 1-4, with which the corresponding input is connected. The manual adjusting buttons 1 to 4 are open in the normal position, i.e., an H-signal is present at the inputs of the multiple AND-element U5 by reason of the resistances R4 and therewith an H-signal is also present at the output thereof. With open manual adjusting buttons 1-4, the base potential of the transistor T5 is therefore determined only by the output signal of the first OR-element O1 and therewith by the position of the position buttons 5 and 6. If an L-signal (no position button actuated) exists at the output of the OR-element O1, then the transistor T5 is nonconducting, if in contrast thereto, an H-signal is present at the output of the OR-element O1 (at least one position button actuated), then the transistor T5 is conductive. However, as soon as a manual adjusting button is actuated, the coordinated input of the multiple AND-element U5 passes over to an L-signal and therewith also the output thereof. As a result thereof, the base potential of the transistor T5 is lowered by way of the diode D5 so that the transistor T5 becomes nonconductive, i.e., is blocked. Thus, during actuation of a manual adjusting button, a programmed seat adjustment is interrupted.

An interruption of the programmed seat adjustment should also take place when the memory button 7 and a position button or at least two position buttons 5 and 6 are actuated simultaneously. For that purpose, AND-elements U1 and U2 are provided whose first input is connected with one position button 5 and 6 each and whose second input is connected with the memory button 7 so that during actuation of the memory button 7 and of a position button 5 and 6, an H-signal appears at the output of the AND-element coordinated to this position button. Furthermore, a number of AND-elements (in the instant case, AND-elements U3 and U4) are provided as corresponds to the possible combinations of two position buttons each, with which the inputs are connected corresponding to this logic, so that with simultaneous actuation of two position buttons, an H-signal appears at the output of the coordinated AND-element U3 or U4.

The outputs of the AND-elements U1 to U4 form the inputs of a second OR-element O2 which carries an H-signal if at least one output of one AND-element has an H-signal. The output of the second OR-element O2 is applied to the control logic 8 in the sense that a programmed seat adjustment which has just been carried out, is interrupted by blocking of the transistors T1 to T4. The output of the multiple AND-element U5 is connected by way of an inverter N with a further input of the second OR-element O2 so that also during actuation of a manual adjusting button 1 to 4, not only the common transistor T5 is blocked, but also the control logic 8 is blocked in that the output of the multiple AND-element U5 passes over to an L-signal which is inverted in the inverter N so that the further input and the output of the second OR-element O2 receives an H-signal, as a result of which the control logic 8 is blocked. The AND-elements U1 to U4 and the second OR-element O2 are referred to as "logic circuit."

A failure-monitoring circuit of conventional type and therefore not illustrated in detail is indicated by the arrows Sb and Sc which represent inputs for the control logic 8; the failure-monitoring circuit monitors and tests the adjusting motors 9 and 10, the position pick-ups thereof (not shown) and the relay contacts, respectively, transistor circuits coordinated thereto with respect to their operability. This failure-monitoring circuit can be so constructed that if within a predetermined time interval no change of the position-actual value takes place notwithstanding a controlled motor energization, a programmed control of the corresponding adjusting motor is interupted. Such circuits are known as such, for example, in connection with stepping motors and are therefore not described in detail herein.

Furthermore, a circuit for the protection of the stored values (in the instant case, of the stored seat positions) is provided which is contained in the control logic 8. Such circuits are known, for example, in connection with clocks or radio-alarm clocks and are therefore not described in detail herein.

With constructions as volatile memory in the control logic 8, the stored data are lost in case of an interruption of the energy supply. After reconnection random bits are present in the memory. No adjustment takes place in this condition notwithstanding actuation of a position key as long as a storing operation has not taken place anew. This can be realized in that during the first storing operation, a code word defined in a ROM is transmitted into the memory. Prior to each programmed adjustment, this code word is compared with the content of the ROM, and a seat adjustment is initiated only when the two words correspond.

All requirements are fulfilled in a simple manner by the described circuit in accordance with the present invention.

While we have shown and described only one embodiment in accordance with the present invention, it is understood that the same is not limited thereto but is susceptible of numerous changes and modifications as known to those skilled in the art, and we therefore do not wish to be limited to the details shown and described herein, but intend to cover all such changes and modifications as are encompassed by the scope of the appended claims.

We claim:

1. A safety arrangement for an adjusting installation of a seat actuatable manually by manual adjusting buttons or programmed by way of position buttons, comprising one adjusting motor for each adjusting plane selectively controllable by way of contact means, of relay means, and a control logic circuit means including position memory means for storing certain seat positions by way of a memory button, characterized in that each adjusting motor is connected in a series circuit with relay contact means coordinated thereto, that all series circuits are connected in parallel and in that the parallel circuit is connected at its two interconnections in series with a change-over relay contact means which is connected in the normal position with one terminal and in the operating position with the other terminal of an energy source, in that the relay means include energizing windings connected on one side directly with one terminal of the energy source and on the other side with the other terminal of the energy source, on the one hand, by way of a matrix means and the manual adjusting buttons and, on the other hand, by way of a series circuit including one transistor circuit means each controlled by the coordinated position button by way of the memory means and the control logic circuit means and coordinated to a corresponding relay means and of a transistor circuit means common to all relay means, the common transistor circuit means being conductive during actuation of a position button and being nonconductive with non-actuated buttons as well as with actuated manual adjusting buttons by themselves or together with position buttons, in that a programmed seat adjustment is interrupted if in addition to the position button coordinated to the seat adjustment a further position button or a manual adjusting button is actuated causing energization of the relay means coordinated to the actuated manual adjusting button, in that a manual seat adjustment is interrupted as long as the two manual adjusting buttons coordinated to the forward as also to the rearward movement of one and the same adjusting motor are simultaneously actuated, and in that an energization of a relay means is interrupted during a programmed seat adjustment if, within a predetermined time interval, the actual value of the adjusting motor position coordinated to the relay means and detected by an actual value pick-up means is not changed.

2. A safety arrangement according to claim 1, characterized in that with a position memory means constructed as volatile memory, a programmed seat adjustment takes place after a disconnection and reconnection of the energy supply only after a renewed storing operation coordinated to the corresponding position button.

3. A safety arrangement according to claim 2, characterized in that for rendering the common transistor circuit means conductive and nonconductive by way of its control input, a multiple AND-element is provided having one input each coordinated to each manual adjusting button, in that a first OR-element with one input coordinated to each position button is provided, in that the output of the first OR-element is operatively connected with the output of the multiple AND-element by way of a resistance and diode, and in that the point of connection between said resistance and diode is connected with the control input of the common transistor circuit means.

4. A safety arrangement according to claim 3, characterized in that for interrupting a programmed seat adjustment, a logic circuit means is provided which includes one input each coordinated to each position button and the memory button and with a further input, said logic circuit means being operable to produce an output signal to the control logic means if the memory button and a position button or at least two position buttons are actuated at the same time or if a signal exists at the further input.

5. A safety arrangement according to claim 4, characterized in that the logic circuit means includes for each combination of the memory button with a position button, on the one hand, and of two position buttons, on the other, one AND-element, and a second OR-element with one input for the output of each AND-element and for the further input, the output of said second OR-element being the output of the logic circuit means.

6. A safety arrangement according to claim 5, wherein the output of the multiple AND-element is connected with the further input of the logic circuit means either directly or by way of an inverter.

7. A safety arrangement according to claim 6, wherein said seat is a vehicle seat.

8. A safety arrangement according to claim 1, characterized in that for interrupting a programmed seat adjustment, a logic circuit means is provided which includes one input each coordinated to each position button and the memory button and with a further input, said logic circuit means being operable to produce an output signal to the control logic means if the memory button and a position button or at least two position buttons are actuated at the same time or if a signal exists at the furher input.

9. A safety arrangement according to claim 8, characterized in that the logic circuit means includes for each combination of the memory button with a position button, on the one hand, and of two position buttons, on the other, one AND-element, and an OR-element with one input for the output of each AND-element and for the further input, the output of said OR-element being the output of the logic circuit means.

10. A safety arrangement according to claim 9, wherein the output of the multiple AND-element is connected with the further input of the logic circuit means either directly or by way of an inverter.

11. A safety arrangement according to claim 9, characterized in that with a position memory means constructed as volatile memory, a programmed seat adjustment takes place after a disconnection and reconnection of the energy supply only after a renewed storing operation coordinated to the corresponding position button.

* * * * *